May 22, 1956 H. H. HOUGH 2,746,792
PATTERN SPRAYING LAWN SPRINKLER
Filed Nov. 3, 1951
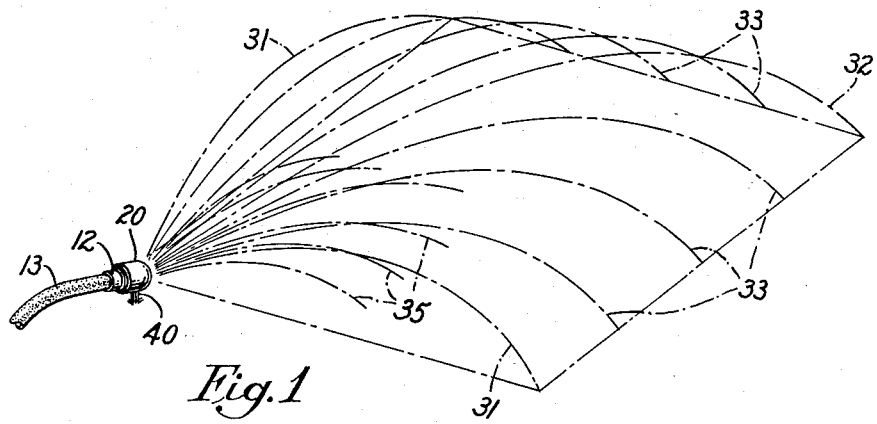
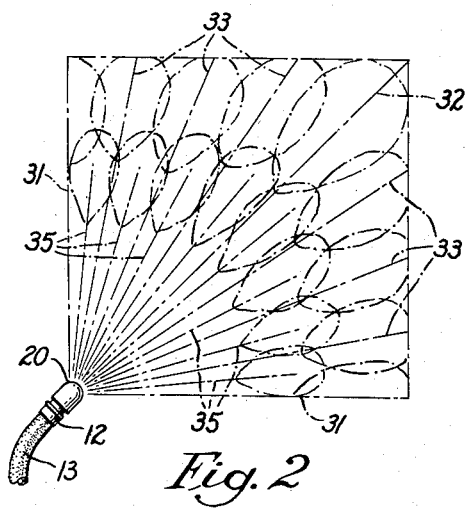
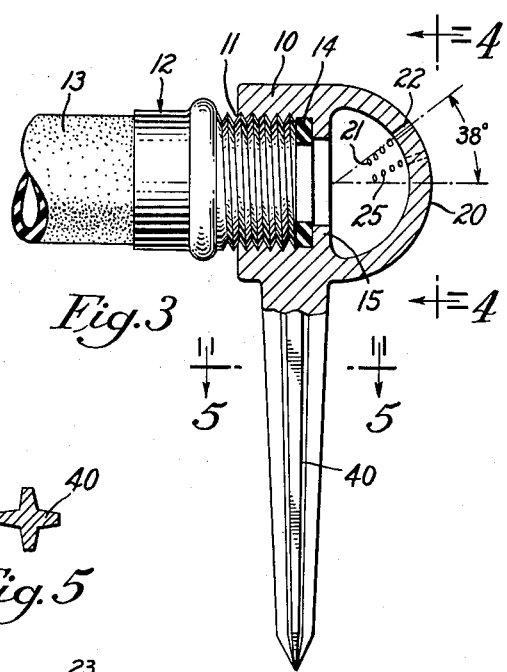
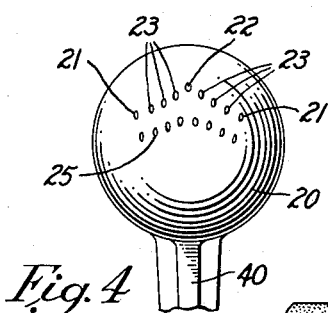
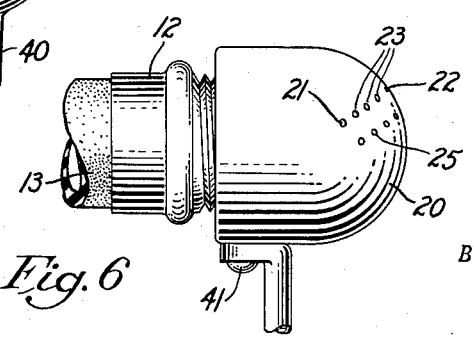
INVENTOR.
HOMER H. HOUGH
BY Gregory S. Dolgorukov
ATTORNEY.

United States Patent Office 2,746,792
Patented May 22, 1956

2,746,792
PATTERN SPRAYING LAWN SPRINKLER
Homer H. Hough, Royal Oak, Mich.
Application November 3, 1951, Serial No. 254,773
3 Claims. (Cl. 299—18)

This invention relates to lawn sprinklers and more particularly to an improved sprinkler adapted to cover rectangular or nearly rectangular areas.

It is commonly known that a common lawn in front and around an average house is composed of several rectangular areas formed between the pavement, the side walk, and the driveway, as well as the walk leading from the sidewalk to the side door of the house. On the other hand, conventional sprinklers throw water to cover approximately circular or semi-circular areas. Therefore, in sprinkling a lawn in front of a house, corners of the lawn rectangles do not receive enough water and are difficult to maintain in good condition. On the other hand moving the sprinkler to cover the corners too, causes sprinkling large spots of the sidewalk, inconveniencing passers-by and wasting water which usually tends to drain to the pavement and into the sewer system.

One of the objects of the present invention is to provide an improved lawn sprinkler whereby the above difficulties and disadvantages are overcome and largely eliminated, and a lawn sprinkler is provided which throws water to cover rectangular or nearly rectangular areas.

Another object of the invention is to provide a lawn sprinkler of the foregoing nature, having an improved base.

It is an added object of the invention to provide a lawn sprinkler of the foregoing nature, which is simple in construction, dependable in operation, and is relatively inexpensive to manufacture.

Further objects and advantages of this invention will be apparent from the following description and appended claims, reference being had to the accompanying drawings forming a part of this specification, wherein like reference characters designate corresponding parts in the several views.

Fig. 1 is a perspective view illustrating my improved sprinkler in operation.

Fig. 2 is a plan view of the same.

Fig. 3 is a longitudinal sectional view showing the construction of my improved sprinkler.

Fig. 4 is a front view of the construction of Fig. 3.

Fig. 5 is a sectional view of the sprinkler spike, taken in the direction of the arrows on the section plane passing through the line 5—5 of Fig 3.

Fig. 6 is a side view similar in part to Fig. 3 and showing sprinkler having a spike of a modified construction.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In accordance with the invention I provide a lawn sprinkler adapted to be connected to the end of a garden hose and be steadied on the ground with the aid of suitable means such as a stake or a heavy base. The sprinkler comprises a spherical body, preferably hemispherical or forming at least a quarter sphere, provided with a plurality of water-ejecting orifices. The middle orifice or opening is intended to produce a longer stream, which is attained by ejecting the stream at approximately 38° to the horizontal. The side streams are set at approximately 90° to each other (in plan view) and eject streams at such angles to the horizontal as to provide stream substantially equal in length and extending along the sides of a rectangle formed on the longest stream (in plan view) as a diagonal. A number of intermediate openings is provided to cover the area so defined.

In the drawing there is shown by way of example a lawn sprinkler embodying the present invention. Referring to Figs. 1–5, the sprinkler illustrated therein comprises a body having a cylindrical rear end 10 internally threaded to receive in a manner well known in the art, the externally threaded end 11 of the end fitting 12 of the garden hose 13. A gasket 14 arranged in a recess adjacent the shoulder 15 is provided to ensure fluid-tightness of the connection.

The front end 20 is of a hollow hemispherical shape. A number of water-ejecting or spraying openings or orifices is provided in the wall of the front end 20. In accordance with the invention said orifices are so arranged that the water ejected therethrough covers substantially a rectangular area. In the present embodiment the arrangement employed therein is designed to effect coverage of a square area. It will be understood however that a rectangle with any relationship of sides or angles may be effected, the main limitation being in the maximum available length of the stream.

To effect a square area coverage desired herein, the water-ejecting orifices are arranged to have the extreme streams 31, 31 form in plan view an angle of 90 degrees, with all other openings being arranged to eject streams between said streams 31, 31 (see Fig. 2). The streams 31, 31 are ejected from orifices 21, 21. The stream 32 ejected from the central opening 22 is directed along the diagonal of the square area to be covered. This stream is the stream of maximum length produced by the sprinkler. Such length is attained by providing the orifice 22 in a manner to have its axis form an angle of approximately 38° with the horizontal. The orifices 21, 21 form a somewhat smaller angle with the horizontal to have the length of the streams produced thereby reduced to approximate length of the sides of the square area to be covered. These angles can be experimentally determined.

A plurality of orifices 23 are provided between the orifices 21, 21 and 22 to eject streams 33, 33 covering the areas between those covered by the streams 31, 31 and 32.

The orifices so provided come out to be arranged in an angular row resembling in outline a "Chinese roof," i. e. having two curved sides meeting at a vertex at the orifice 22.

It is to be understood that each stream covers a small elongated area of approximately oval or elliptical shape. By providing water-ejecting orifices sufficiently close to one another, such oval areas are made to overlap and thus cover wider areas without leaving "dry spots."

The streams 31, 31, 32 and 33, 33 cover the outlying portions of the square area to be covered. In order to cover the areas inwardly thereof, a second or lower row of water-ejecting orifices is provided, said row being generally designated by the numeral 25, to produce a plurality of streams 35.

As is best shown in Fig. 4, the lower row 25 is generally similar in shape to the upper row of orifices, with holes of said rows being staggered to effect better coverage. Orifices of the row 25 make correspondingly smaller angles with the horizontal than the orifices of the upper row.

I have found that with two rows of orifices arranged as disclosed above, there is usually no need to provide more orifices to cover the areas immediately adjacent the sprinkler, since fine mist from the sprinkler and drippings from the longer streams are sufficient to cover such adjacent areas.

It should be appreciated that while I illustrate and describe herein one orifice in each specific arrangement, such as the maximum length stream orifice 22, a plurality of such holes in substantially identical arrangement may be provided.

Means are provided to steady or fix the sprinkler in operation in a desired position on the ground. In the embodiment illustrated, said means are in the form of a stake 40 intergrally formed on the body of the sprinkler as shown in Fig. 3, or secured thereto in any suitable manner, such as by riveting as shown at 41 in Fig. 6.

The construction of Figs. 3, 4 and 5 is particularly susceptible of being made by die casting method. The construction of Fig. 6, may be made in an automatic screw machine. Both of the above method ensure low cost and large quantity production.

There is thus provided an improved lawn sprinkler, whereby the objects of the present invention listed above and numerous additional advantages are attained.

I claim:

1. A portable lawn sprinkler comprising a closed hollow body adapted to be connected to the end of a hose and to be retained in position on the ground, a plurality of spraying orifices provided on said body to produce a corresponding plurality of spary streams at different angles to the horizontal place and consequently of different respective lengths, the arrangement of the extreme side openings being such that they produce streams forming approximately 90 degree angles to each other and determining the two sides of a rectangular area, with at least one middle opening directing its stream to form a diagonal of the area determined by said two side streams, with the rest of the openings being arranged to produce streams to cover the rest of the area determined by said side and said diagonal streams, with said body having a hollow hemispherical front disposed vertically in the operative position of the sprinkler, with the spray orifices being provided solely in the curved surface of said front.

2. A portable one-piece lawnsprinkler comprising a die cast body having a hollow part-spherical front and a rear end adapted to be connected to a hose, with a stake integrally formed on said body and projecting downwardly therefrom to adapt the sprinkler for staking into the ground, a plurality of spraying orifices provided on the part-spherical front end of said body at different elevations to produce spray streams at different angles to the horizontal plane and consequently of different respective lengths, the center opening being provided on a portion of the curved surface to produce a stream at 38 degree angle with the horizontal, the extreme side openings being provided on the portions of the curved surfaces of said front forming in plan view a 90 degree angle with respect to each other and in elevation such angles with the horizontal as to produce streams having length of two sides of a square area determined by the length of the center stream as a diagonal of said area, with the rest of the openings being arranged intermediately said openings to produce streams covering the rest of the area so determined.

3. The invention defined in claim 2, said stake being of a cross-shaped cross section to prevent rotation of the sprinkler when staked into the ground.

References Cited in the file of this patent

UNITED STATES PATENTS

| | | |
|---|---|---|
| 1,613,336 | Thompson | Jan. 4, 1927 |
| 1,651,887 | Hawes | Dec. 6, 1927 |
| 1,873,321 | Elder | Aug. 23, 1932 |
| 2,469,534 | Wessels | May 10, 1949 |
| 2,631,889 | Johnson | Mar. 17, 1953 |

FOREIGN PATENTS

| | | |
|---|---|---|
| 10,627 | Great Britain | 1906 |
| 13,765 | Netherlands | Oct. 15, 1925 |